Patented May 27, 1947

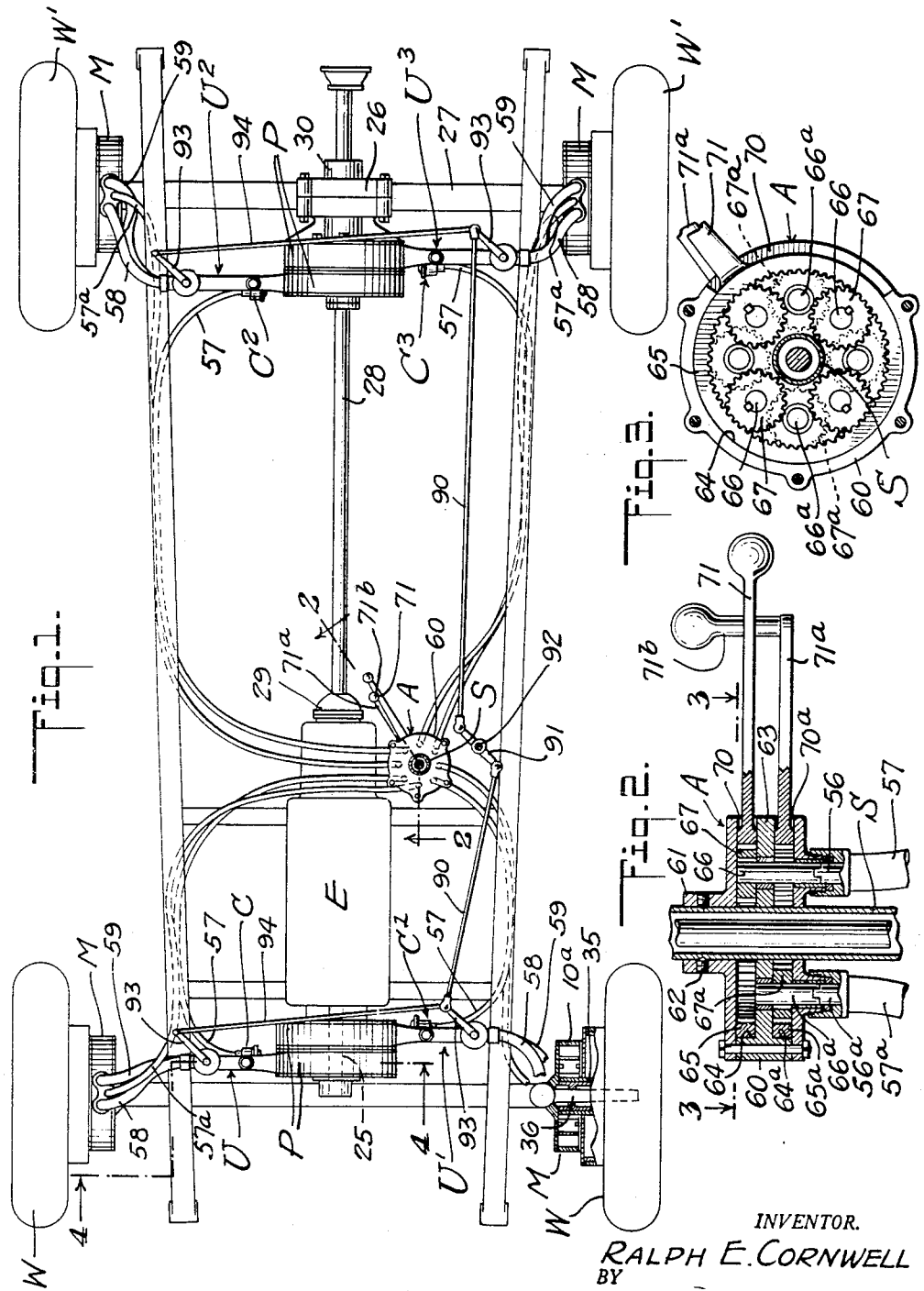

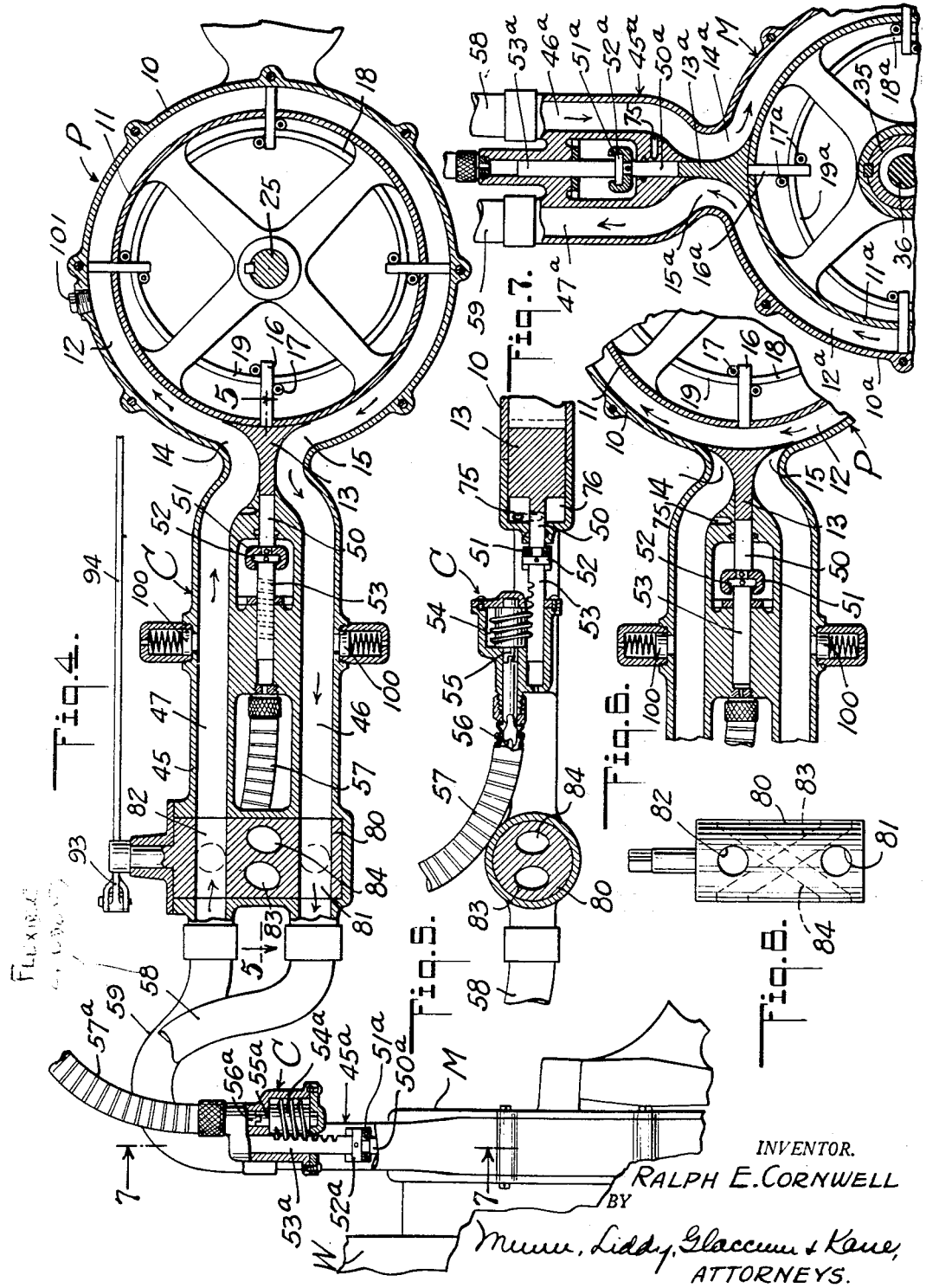

2,421,013

UNITED STATES PATENT OFFICE 2,421,013

HYDRAULIC DRIVING, BRAKING, AND FREE-WHEELING MECHANISM FOR VEHICLES

Ralph E. Cornwell, La Canada, Calif.

Application April 20, 1942, Serial No. 439,680

6 Claims. (Cl. 60—53)

This invention relates generally to self propelled vehicles, and more particularly to mechanisms for driving, braking and free wheeling operations upon automotive vehicles.

An object of this invention is to provide mechanism including hydraulic pumps operatively connected to individual wheel motors and to the prime mover of the vehicle in a manner to hydraulically deliver power to the wheel motors with a minimum of hydraulic friction losses; to impose any degree of braking action upon the wheels through the medium of the wheel motors; and to enable free wheeling operation of the vehicle to be effected with a minimum of fluid drag, all by simple manipulation of a novel actuating device by which the flow of hydraulic energy between and within the pumps and wheel motors, is smoothly controlled to attain the driving, braking, or free wheeling functions, whereby to greatly simplify operation of the vehicle.

A further object of the invention is to provide a mechanism of the above described character which embodies hydraulic reversing means for propulsion of the vehicle in either direction; which has its pumping units arranged in juxtaposition to the hydraulic motors to reduce hydraulic friction losses to a minimum; and to enable similar wheel motors on a trailing vehicle to be efficiently operated from the prime mover of the latter.

Another object of the invention is to provide a hydraulically operating mechanism as above described wherein the flow of hydraulic energy between the pumps and wheel motors to effect driving, braking, or free wheeling, is controlled by synchronized and interlocked operation of novel valving partitions of the pumps and wheel motors, in a manner to vary the volume of fluid circulated therebetween to accordingly vary the hydraulic energy at the wheel motors for driving and braking purposes, or to cause the circulation of the fluid idly within the pumps and wheel motors for free wheeling operation of the latter.

With these and other objects in view, the invention resides in the combinations, arrangements and functional relationships of elements as set forth in following specification and particularly pointed out in the appended claims.

In the accompanying drawings,

Figure 1 is a semi-diagrammatic plan view illustrating one form of hydraulic driving, braking and free wheeling mechanism for vehicles embodying this invention, applied to the chassis of an automobile;

Figure 2 is an enlarged sectional view of an actuating device taken on the line 2—2 of Figure 1;

Figure 3 is a plan sectional view taken on the line 3—3 of Figure 2;

Figure 4 is an enlarged sectional view of a typical pumping and wheel motor unit, taken on the line 4—4 of Figure 1;

Figure 5 is a fragmentary sectional view taken on the line 5—5 of Figure 4;

Figure 6 is a fragmentary sectional view of the pump portion of Figure 4 and illustrating the free wheeling position of the pump;

Figure 7 is a fragmentary sectional view of a wheel motor, taken on the line 7—7 of Figure 4; and Figure 8 is a view in side elevation of the valving element of the reversing valve associated with each pump and wheel motor unit.

Referring specifically to the drawing, the invention in its broad aspect is composed of hydraulic pump and motor units one for each wheel of the vehicle as indicated at U, U1, U2 and U3 in Figure 1, these units being of identical construction so that a detailed description of one will suffice for all.

The pumps P of the aforestated units are of the rotary positive displacement type, and each is constructed to provide a fixed cylindrical casing 10 (Figure 4) in which is journaled a cylindrical rotor 11 co-acting with the casing to define therebetween an annular working chamber 12 adapted to be fully interrupted, more or less restricted, or rendered entirely free at one point by a valving partition 13 which is movably mounted in the casing and is adapted to be actuated in a manner to be later fully described. At opposite sides of the partition 13 and adapted to be controlled thereby are inlets and outlets 14 and 15 respectively, for the working chamber 12.

Slidably mounted in the rotor 11 for movement radially thereof are a plurality of vanes 16 having rollers 17 riding upon opposite sides of fixed cam tracks 18 in the casing at opposite sides of the rotor. The cam tracks 18 are circular and concentric with respect to the rotor axis except for a portion 19 opposite the partition 13, which portion is eccentric. The concentric portions of the tracks co-act with the rollers in maintaining the vanes 16 projected so as to span the working chamber 12 and effect the pumping of liquid therethrough, whereas the portion 19 co-acts with the rollers in retracting the vanes sufficiently to clear the partition 13 when the latter occupies its one extreme or fully obstructing position shown in Figure 4.

The hydraulic motors M are identical in construction to that of the pumps P as shown in Figures 1, 4 and 7, each being composed of a fixed casing 10a, a cylindrical rotor 11a journaled concentrically therein to define an annular working chamber 12a interrupted by a partition 13a movably mounted in the casing 10a and functioning in the same manner as the partitions of the pumps P. At opposite sides of the partitions 13a and adapted to be controlled thereby, are inlets and outlets 14a and 15a respectively, for the working chamber 12a, all as shown in Figure 7.

Slidably mounted in the rotor 11a for movement radially thereof are a plurality of vanes 16a having rollers 17a riding upon opposite sides of fixed cam tracks 18a in the casing at opposite sides of the rotor. The cam tracks 18a actuate the vanes by retracting same under the camming action of the eccentric portion 19a so as to clear the partition in its one extreme or fully obstructing position shown in Figure 7, during rotation of the rotor 11a under the action of liquid delivered to the rotor by the respective pump P.

Those pumps P for the two front wheels W of the vehicle are suitably supported co-axially in advance of the prime mover E, with the casings 10 of the pumps fixed against rotation and their rotors fixed to the engine shaft 25 which is extended forwardly of the cylinder block as shown in Figure 1. The two pumps for the rear wheels W' are supported co-axially with their casings 10 secured by a bracket 26 to the rear dead axle 27 of the rear wheels. The rotors 11 of these pumps are fixed to a propeller shaft 28 operatively connected to the rear extension of the engine shaft 25 by a universal joint 29, and journaled in a bearing 30 for connection to a driving shaft (not shown) of a similar hydraulic driving and braking mechanism applied to a trailer for its propulsion when coupled to the driving vehicle.

The rotors 11 of the hydraulic motors M are fixed to the hubs 35 of the wheels W and W', the motors for the front wheels having their casings 10a fixed with respect to the wheel spindles 36, one of which is illustrated in Figure 1.

For each of the four pump and motor units, a control means is provided, the several control means being designated respectively at C, C', C2 and C3. As these control means are identical in construction, a detailed description of one will suffice for all. By reference to Figures 4, 5 and 6, it will be seen that each control means is composed of a body 45 having spaced parallel feed and return passages 46 and 47 respectively, formed integral with the casing 10 of the respective pump P, or rigidly secured thereto to extend radially therefrom, with one end of the feed passage 46 in communication with the outlet 15, and the corresponding end of the return passage 47 in communication with the inlet 14.

The several partitions 13 and 13a are to be broadly construed as part of the aforestated control means, the partition 13 for the respective pump P being reciprocably mounted in the body 45 between the passages 46 and 47 for adjustment from the extreme position shown in Figure 4 wherein the inlet 14 and outlet 15 are fully open so that the maximum volume of liquid can be forced by the pump through the respective wheel motor in a uni-directional circulation, to the extreme position shown in Figure 6 wherein the partition closes the inlet and outlet according as driving of the vehicle or full braking or free wheeling operation thereof is to be effected, all in a manner to be fully described.

Various intermediate positions of the partition result in various open positions of the inlet and outlet to restrict the aforestated uni-directional circulation of liquid through the pump and motor unit to a greater or lesser extent for partial braking operations.

The partition 13 is provided with a shank 50 having a coupling yoke 51 on its outer extremity detachably receiving a head 52 on one end of a rack bar 53 reciprocably mounted in the body 45 coaxially of the shank 50. Constantly meshing with the teeth of the rack bar 53 is a worm 54 rotatably mounted in the body 45 by means of a stub shaft 55 operatively connected to one end of a flexible shaft 56 working in a suitable protecting conduit 57 and connected at its other end to an actuating device A (Figures 1, 2 and 3) common to all pumps and motors. It will be clear that rotation of the worm 54 by the shaft 56 will effect adjustment of the partition to any desired position.

Connected to the body 45 in communication with the other ends of the passages 46 and 47, are flexible conduits 58 and 59 which connect said passages with one end of similar passages 46a and 47a in a body 45a formed integral with or rigidly secured to the casing 10a of the respective motor M as shown in Figure 7.

The other ends of the passages 46a and 47a are in communication respectively, with the inlet 14a and outlet 15a of the working chamber 12a, at opposite sides of the valving partition 13a.

The partition 13a for the respective motor M is provided with a shank 50a having a coupling yoke 51a on its outer extremity, detachably receiving a head 52a on one end of a rack bar 53a reciprocably mounted in the body 45a coaxially of the shank 50a. Constantly meshing with the teeth of the rack bar 53a is a worm 54a rotatably mounted in the body 45a by means of a stub shaft 55a operatively connected to one end of a flexible shaft 56a working in a suitable protecting conduit 57a and connected at its other end to the aforesaid actuating device A. Thus, rotation of the worm 54a by the shaft 56a will reciprocably adjust the partition 13a to any desired position.

The actuating device A is composed of a circular housing 60 which is supported by the steering column S of the vehicle or by other means to locate the device convenient for manipulation by the operator. The housing 60 is provided with a central opening to receive the steering column and is further provided with a collar 61 through which project fastening members 62 to rigidly secure the housing at the desired height on the latter.

The housing 60 is divided interiorly by a transverse wall 63 to provide circular compartments 64 and 64a in which are rotatably mounted, internal ring gears 65 and 65a. Fixed to shafts 66 journaled in the housing and in the wall 63, are pinion gears 67 which constantly mesh with the ring gear 65. As shown in Figure 2, the flexible shafts 56 are coupled to the shafts 66 so that rotation of the ring gear 65 will rotate the four pinion gears 67 simultaneously and identically to impart corresponding movements to the worms 54, whereby to actuate the valving partitions 13 of the units U, U1, U2 and U3 in unison.

Fixed to the shafts 66a journaled in the housing 60 and in the wall 63, are pinion gears 67a which constantly mesh with the ring gears 65a, the flexible shafts 56a being coupled to the shafts 66a so that rotation of the ring gear 65a will rotate the four pinion gears 67a simultaneously and identically to impart corresponding movements to the worms 54a, whereby to actuate the partitions 13a of the four motor units in unison.

Fixed to the ring gear 65 and projecting through a slot 70 in the housing 60, is an operating member in the form of a straight lever 71 whose oscillatory movement is sufficient to move the partitions 13 from the extreme position shown in Figure 4 to the extreme position shown in Figure 6.

Fixed to the ring gear 65a and projecting through a slot 70a in the housing 60, is an operating member in the form of an L-shaped lever 71a, the lateral branch 71b of which provides an interlocking operative connection between the lever 71 and the lever 71a upon movement of the latter in that direction which will move the partitions 13a to the extreme position wherein the ports 14a and 15a are closed by the partitions. This operative connection compels corresponding movement of the lever 71, to move the partition 13 to the corresponding extreme position shown in Figure 6 wherein the ports 14 and 15 are closed by the partition, all for the purpose of obtaining free wheeling operation by confining circulation of liquid within the working chambers 12 and 12a of the pumps P and motors M, respectively. Under such condition, the liquid within the passages 46, 47, 46a, 47a and within the conduits 58 and 59 remains stationary, thus reducing to a minimum the hydraulic friction loss, and obtaining a highly efficient free wheeling effect.

With the free wheeling lever 71a occupying its inactive or non-free wheeling position shown in Figure 3, independent movement of the driving and braking control lever 71 can be effected to move the partitions 13 of the several pumps P to any position desired for speed and braking operations.

With the partitions 13 occupying the position shown in Figure 4, and the partitions 13a occupying the corresponding position, maximum circulation of fluid by the pumps P through the motors M can be effected to transmit the maximum power to the wheels. When the partition 13 is moved slightly to the left from its Figure 4 position, a part of the pumped fluid will pass such partition from 15 to 14 while the remainder will pass into passage 46, providing the load on the motor M is not too high, i. e., if the restriction at the partition 13 is sufficient to permit a sufficient pressure to build up at 15 to overcome the load on the motor M. When the partition is moved so far to the left that the resistance to the flow of fluid past the partition is less than the load on the motor, no flow into the passage 46 will occur so that all of the fluid will be transferred from 15 to 14.

At this time, if the motor M has been operating, it will pump fluid from the passage 47 into the inlet 14 and force as much fluid past the partition 13 into the outlet 15 as cannot be supplied to the passage 46 by the pump, the fluid passing from the outlet 15 into the passage 46. Very little braking action on the motor will be effected and thus is proportional to the force required for the motor to move the fluid from the passage 47, past the partition 13 and into the passage 46.

Further movement of the partition 13 to the left will cause a throttling of the fluid from the motor into the inlet 14 and will also throttle the flow from the outlet 15 into the passage 46, thus causing an increase in the braking action on the motor. As the partition is moved to the left, the braking action continues to increase until the partition 13 completely closes the inlet 14 and the outlet 15 and blocks off the passages 47 and 46 so that a hydraulic locked condition for the motor is obtained, provided motor partition 13a is in its Figure 7 position. During this time, the pump will merely circulate the fluid past the partition 13 from 15 to 14, see Figure 4.

If the vehicle is at locked condition, i. e., with the pump as in Figure 6 and the motor as in Figure 7, the partition 13a of the motor may be moved toward closed position to permit the rotor to move by allowing fluid to flow from 14a, past partition 13a to 15a, or vice versa. When the vehicle is moving and it is desired that such motion continue, both partitions 13 and 13a must be operated so that a bypass of the fluid within the motor can occur previous to the partition 13 reaching its Figure 6 position.

The compression of the prime mover E can be utilized as a brake by permitting the wheel motors M to circulate the fluid through the system. For additional braking, the lever 71 is actuated to cause the partitions 13 to restrict the ports 14 and 15 for increased braking to the maximum of a hydraulic locking of the wheels, as is obtained with the ports 14 and 15 fully closed by the partitions.

It will be noted that the worms 54 for the wheels on one side of the vehicle should be the opposite hand to those for the wheels on the other side of the vehicle due to the opposite disposition of such worms with respect to the pumps, in order to obtain corresponding movements of the partitions 13 by operation of the actuating device A. It will also be noted that a suitable duct 75 can connect the working chambers 12 and 12a with a chamber 76 in which each of the partitions 13 and 13a are received, so as to balance the hydraulic forces acting upon the partitions.

By reference to Figures 1, 4, 5 and 8, it will be noted that a reverse valving mechanism is provided and comprises a cylindrical valving element 80 one for each of the units U, U1, U2 and U3, and oscillatively mounted in each body 45. Each element 80 is provided with diametric passages 81 and 82 co-actable with the passages 46 and 47 to permit unrestricted flow of liquid therethrough for forward driving of the motor M of the respective unit. The element 80 is also provided with oblique passages 83 and 84 in crossed and laterally spaced relationship for co-action with the passages 46 and 47 in a ninety degree advanced position from that shown in Figure 4, in reversing the direction of liquid flow to the motor M, so as to reverse the direction of rotation of the rotor 11a thereof.

The four reversing elements 80 are actuatable correspondingly by the operator through an operative connection, which as illustrated, is composed of rods 90 universally jointed to a rocker arm 91 fixed to a rockably mounted shaft 92. These rods are connected to the levers 93 of two of the reversing elements 80 with links 94 joining such rods to the similar levers 93 of the other two elements 80 as is clearly shown in Figure 1.

Mounted in each of the bodies 45 so as to be subject to the hydraulic pressure in the system, are spring loaded pistons 100 (Figure 4) which yield to pressure in excess of a predetermined maximum pressure necessary to operate the motors, whereby to prevent "liquid hammer" in the system and prevent surging of the liquid.

It will be understood that suitable plug controlled openings 101 at various locations in the liquid system are provided to enable a suitable liquid such as oil or brake fluid to be supplied to the system to completely fill the latter as well as enable the system to be drained of the liquid.

I claim:

1. Hydraulic driving, braking and free wheeling mechanism for vehicles comprising: positive displacement hydraulic motors directly connected to the vehicle wheels; positive displacement hydraulic pumps, one for each motor; means by which said pumps are adapted to be driven from the prime mover of the vehicle; means defining a liquid circuit between each motor and the respective pump, for circulation of liquid by the pumps to the motors to drive the vehicle; control means correlated with said pumps by which the circulation of liquids from the pumps can be variably restricted or prevented to the motors to variably brake the wheels, the preventing of liquid flow from the pumps to the motor also preventing flow from the motor to the pump for hydraulically locking the motor; and control means correlated with the motors and co-actable with the last said means to confine the liquid in idling circuits in the respective motors for free wheeling operation of the vehicle.

2. Hydraulic driving, braking and free wheeling mechanism for automotive vehicles comprising: hydraulic motors directly connected to the vehicle wheels; hydraulic pumps, one for each motor; means by which said pumps are adapted to be driven from the prime mover of the vehicle; means defining a liquid circuit between each motor and the respective pump, for circulation by the pumps to the motors to drive the vehicle; control means correlated with said pumps by which circulation of liquid from the pumps can be variably restricted or prevented to the motors to accordingly variably brake the wheels, the preventing of liquid flow from the pump to the motor also preventing flow from the motors to the pumps for hydraulically locking the motors; control means correlated with the motors and co-actable with the last said means to confine the liquid in idling circuits in the respective motors for free wheeling operation of the vehicle; means for actuating said braking control means; means for actuating said free wheeling control means; and means operatively connecting said two actuating means to render said braking control means actuatable independently for operations other than free wheeling.

3. Hydraulic driving, braking and free wheeling mechanism for automotive vehicles comprising: hydraulic motors directly connected to the vehicle wheels; hydraulic pumps, one for each motor; means by which said pumps are adapted to be driven from the prime mover of the vehicle; each of said pumps and motors including an annular working chamber having an inlet and an outlet port disposed adjacent to each other with a valving partition interposed therebetween and constituting ends for the chamber when the inlet and outlet are fully open; means defining liquid circuits connecting the inlet and outlet of each pump with the outlet and inlet, respectively, of the respective motor; means mounting the pump partitions for adjustment from a position wherein said pump ports are fully open for driving operation of the motor connected thereto, through intermediate positions wherein said pump ports are partially open by the partitions and the ports of each pump communicate with each other for permitting a partial bypassing of the fluid from the pump outlet directly to the pump inlet for variable braking operations, to a position where the partitions close said pump ports for brake locking operation by preventing liquid flowing through said liquid circuit means; means mounting the motor partitions for adjustment from a position wherein said motor ports are fully open for driving operation, to a position where the partitions will close said motor ports and open a bypass between the ports of each motor for free wheeling; means for actuating the pump partitions in unison; and means for actuating the motor partitions in unison.

4. Hydraulic driving, braking and free wheeling mechanism for automotive vehicles comprising: hydraulic motors directly connected to the vehicle wheels; hydraulic pumps, one for each motor; means by which said pumps are adapted to be driven from the prime mover of the vehicle; each of said pumps and motors including an annular working chamber having an inlet and an outlet port disposed adjacent to each other with a valving partition interposed therebetween and constituting ends for the chamber when the inlet and outlet are fully open; means defining liquid circuits connecting the inlet and outlet of each pump with the outlet and inlet, respectively, of the respective motor; means mounting the pump partitions for adjustment from a position wherein said pump ports are fully open for driving operation of the motor connected thereto, through intermediate positions wherein said pump ports are partially open by the partitions and the ports of each pump communicate with each other for permitting a partial bypassing of the fluid from the pump outlet directly to the pump inlet for variable braking operations, to a position where the partitions close said pump ports for brake locking operation by preventing liquid flowing through said liquid circuit means; means mounting the motor partitions for adjustment from a position wherein said motor ports are fully open for driving operation, to a position where the partitions will close said motor ports and open a bypass between the ports of each motor for free wheeling; means for actuating the pump partitions in unison; means for actuating the motor partitions in unison; and means operatively connecting the first said actuating means for movement by the second said actuating means to adjust the pump and motor partitions as a unit for free wheeling.

5. Hydraulic driving, braking and free wheeling mechanism for automotive vehicles comprising: hydraulic motors directly connected to the vehicle wheels; hydraulic pumps, one for each motor; means by which said pumps are adapted to be driven from the prime mover of the vehicle; each of said pumps and motors including an annular working chamber having juxtaposed inlet and outlet ports and a valving partition placed between juxtaposed ports and being adjustable for controlling liquid circulation in said chambers and through said pump and motor ports; means defining liquid circuits connecting the inlet and outlet ports of each pump with the outlet and inlet ports, respectively, of the respective motor; means mounting said partitions for adjustment from one extreme position wherein they span the respective working chambers transversely between the inlet and outlet ports thereof and with the latter fully open, to another extreme position wherein they clear the working chambers to permit liquid to freely flow therein and close the respective inlet and outlet ports; actuating means common to the pump partitions; and actuating means common to the several motor partitions, said pump and motor ports when fully opened permitting fluid to flow from the pumps to the motors through the circuit means for operating the motors, said pump ports when partially or entirely closed by their partitions slowing down or stopping the fluid flow to partially or fully apply a braking effect to the motors, and said motor ports when fully closed permitting fluid to flow in the motor annular chambers to permit free wheeling.

6. Hydraulic driving, braking and free wheeling mechanism for automotive vehicles comprising: hydraulic motors directly connected to the vehicle wheels; hydraulic pumps, one for each motor; means by which said pumps are adapted to be driven from the prime mover of the vehicle; each of said pumps and motors including an annular working chamber having juxtaposed inlet and outlet ports and a valving partition placed between juxtaposed ports and being adjustable for controlling liquid circulation in said chambers and through said pump and motor ports; means defining liquid circuits connecting the inlet and outlet ports of each pump with the outlet and inlet ports, respectively, of the respective motor; means mounting said partitions for adjustment from one extreme position wherein they span the respective working chambers transversely between the inlet and outlet ports thereof and with the latter fully open, to another extreme position wherein they clear the working chambers to permit liquid to freely flow therein and close the respective inlet and outlet ports; actuating means common to the pump partitions for operating same in unison; actuating means common to the motor partitions for actuating same in unison; and means co-acting with said actuating means to compel the first mentioned thereof to be actuated by the second mentioned thereof in a direction to adjust the pump and motor partitions as a unit to the second mentioned extreme position where the fluid will freely flow in the annular chambers of the pumps and motors to permit a free wheeling operation.

RALPH E. CORNWELL.

REFERENCES CITED

The following references are of record in the file of this patent:

UNITED STATES PATENTS

| Number | Name | Date |
| --- | --- | --- |
| 1,999,288 | Fjellstedt | Apr. 30, 1935 |
| 958,212 | Baab | May 17, 1910 |
| 1,100,004 | Williams | June 16, 1914 |
| 1,294,121 | Lape | Feb. 11, 1919 |
| 1,354,777 | Rock | Oct. 5, 1920 |
| 1,426,902 | Noel et al. | Aug. 22, 1922 |
| 1,008,202 | Schmucker | Nov. 7, 1911 |
| 1,099,161 | Brown | June 9, 1914 |
| 1,977,033 | Adams | Oct. 16, 1934 |

FOREIGN PATENTS

| Number | Country | Date |
| --- | --- | --- |
| 610,290 | France | June 2, 1926 |
| 398,904 | Germany | July 24, 1924 |